US011866913B2

(12) United States Patent
Uji

(10) Patent No.: US 11,866,913 B2
(45) Date of Patent: Jan. 9, 2024

(54) CONSTRUCTION MACHINE

(71) Applicant: HITACHI CONSTRUCTION MACHINERY CO., LTD., Tokyo (JP)

(72) Inventor: Katsumasa Uji, Tsukuba (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 789 days.

(21) Appl. No.: 16/979,271

(22) PCT Filed: Jul. 2, 2019

(86) PCT No.: PCT/JP2019/026297
§ 371 (c)(1),
(2) Date: Sep. 9, 2020

(87) PCT Pub. No.: WO2020/044777
PCT Pub. Date: Mar. 5, 2020

(65) Prior Publication Data

US 2021/0054600 A1 Feb. 25, 2021

(30) Foreign Application Priority Data

Aug. 29, 2018 (JP) ................................ 2018-160527

(51) Int. Cl.
*E02F 9/26* (2006.01)
*E02F 3/32* (2006.01)
(Continued)

(52) U.S. Cl.
CPC ................ *E02F 9/264* (2013.01); *E02F 3/32* (2013.01); *E02F 5/145* (2013.01); *G07C 5/0808* (2013.01); *G07C 5/0825* (2013.01); *G07C 5/12* (2013.01)

(58) Field of Classification Search
CPC ... E02F 9/264; E02F 3/32; E02F 5/145; E02F 3/435; E02F 9/2012; E02F 9/2025;
(Continued)

(56) References Cited

U.S. PATENT DOCUMENTS

2015/0330060 A1 11/2015 Seki et al.
2016/0116328 A1* 4/2016 Kivi ...................... A01G 23/00 702/101

(Continued)

FOREIGN PATENT DOCUMENTS

JP 2012-172431 A 9/2012
WO 2015/173920 A1 11/2015

(Continued)

OTHER PUBLICATIONS

International Search Report of PCT/JP2019/026297 dated Sep. 24, 2019.

*Primary Examiner* — Hunter B Lonsberry
*Assistant Examiner* — Daniel M. Robert
(74) *Attorney, Agent, or Firm* — MATTINGLY & MALUR, PC

(57) ABSTRACT

First to third inertial sensors (16, 17, 18) are respectively mounted on a boom (5A), an arm (5B) and a bucket (5C) to rotate in coordinate axes different from each other at the time of operating the boom (5A). In a case where the boom (5A) is operated in a state where a traveling operation pressure Pa and a revolving operation pressure Pb are equal to or less than respective preset operation pressure threshold values, a controller (20) makes a determination on which movable part of the boom (5A), the arm (5B) and the bucket (5C) each of the inertial sensors (16, 17, 18) is mounted, based upon sensor outputs outputted from the inertial sensors (16, 17, 18). The controller (20) sets a corresponding relation between each of the boom (5A), the arm (5B) and the bucket (Continued)

(5C) and each of the inertial sensors (16, 17, 18) based upon the determination result.

4 Claims, 13 Drawing Sheets

(51) Int. Cl.

| | |
|---|---|
| ***E02F 5/14*** | (2006.01) |
| ***G07C 5/12*** | (2006.01) |
| ***G07C 5/08*** | (2006.01) |

(58) Field of Classification Search

CPC ....... E02F 9/26; G07C 5/0808; G07C 5/0825; G07C 5/12

See application file for complete search history.

(56) References Cited

U.S. PATENT DOCUMENTS

| | | | | |
|---|---|---|---|---|
| 2016/0237655 | A1* | 8/2016 | Baba | E02F 9/264 |
| 2017/0089031 | A1* | 3/2017 | Tsukamoto | E02F 3/425 |
| 2018/0171598 | A1 | 6/2018 | Iwamura et al. | |
| 2019/0241124 | A1 | 8/2019 | Izumikawa et al. | |
| 2020/0291610 | A1* | 9/2020 | Misaki | F15B 11/16 |

FOREIGN PATENT DOCUMENTS

| | | | |
|---|---|---|---|
| WO | 2017/072877 | A1 | 5/2017 |
| WO | 2018084161 | A1 | 5/2018 |

* cited by examiner

CONSTRUCTION MACHINE

TECHNICAL FIELD

The present invention relates to a construction machine such as a hydraulic excavator provided with a plurality of sensors for calculating a working posture thereof, for example.

BACKGROUND ART

A hydraulic excavator representative of a construction machine includes an automotive lower traveling structure, an upper revolving structure mounted on the lower traveling structure to be capable of revolving thereon and a working mechanism disposed in the upper revolving structure to be capable of lifting and tilting thereto. The working mechanism includes a boom coupled to the upper revolving structure, an arm coupled to a tip end side of the boom and a bucket coupled to a tip end side of the arm. The hydraulic excavator performs an excavating work by operating the boom, the arm and the bucket.

Here, there is known an auxiliary device for excavating a hole of a predetermined depth and a slope surface of a predetermined gradient, which uses a stroke sensor of a cylinder arranged to each of the boom, the arm and the bucket for detecting a stroke length of each of the cylinders to display position information of the bucket on a display device (Patent Document 1). In addition, there is also known an inertial measurement unit that is mounted on each of a boom, an arm, a bucket and a vehicle body to calculate postures of the vehicle body and a working mechanism based upon detection values of the inertial measurement units (inertial sensors) (Patent Document 2).

PRIOR ART DOCUMENT

Patent Document

Patent Document 1: Japanese Patent Laid-Open No. 2012-172431 A
Patent Document 2: WO2015/173920 A

SUMMARY OF THE INVENTION

Incidentally, for calculating the postures of the vehicle body and the working mechanism, it is required to set on which position of the boom, the arm and the bucket each of the inertial measurement units is attached. In this case, there may be considered a method for performing the setting by attaching the inertial measurement units thereon one by one. This method is, however, required to perform a series of setting works of attaching, setting and removing of the inertial measurement units by the mounting number of the inertial measurement units, possibly posing a problem with hours and labors required for the setting works.

In addition, it may be considered to make the setting of the mounting location of each of the inertial measurement units unnecessary by in advance designating the mounting location of each of the inertial measurement units and making the respective inertial measurement units inertial measurement units exclusive for transmitting detection values thereof in individual formats different from each other. However, although each of the inertial measurement units is composed of an identical inertial measurement unit, they become inertial measurement units for boom, arm, bucket and vehicle body in each mounting location of which a data transmission format is defined, therefore possibly causing the mix-up of the mounting location. Further, for dealing with a failure of each of the inertial measurement units, the inertial measurement units exclusive for the respective mounting locations are required to be prepared in stock. As a result, costs in inventory management and storage of the respective inertial measurement units possibly increase.

The present invention is made in view of the aforementioned problems in the conventional technologies and an object of the present invention is to provide a construction machine that can easily perform the setting of mounting locations for a plurality of inertial sensors.

For solving the aforementioned problems, a construction machine according to the present invention is provided with an automotive lower traveling structure, an upper revolving structure mounted on the lower traveling structure to be capable of revolving thereon, a working mechanism that is disposed in the upper revolving structure and is provided with a plurality of movable parts coupled to each other, a plurality of inertial sensors with the same specification that are respectively mounted on each of the plurality of movable parts to be capable of detecting angular velocities of three coordinate axes perpendicular to each other, a controller configured to calculate a posture of each of the movable parts by using a sensor output of each of the plurality of inertial sensors, a traveling operation pressure sensor that detects a traveling operation pressure for causing the lower traveling structure to travel, and a revolving operation pressure sensor that detects a revolving operation pressure for revolving the upper revolving structure.

Further, the present invention is characterized in that the plurality of inertial sensors are respectively mounted on each of the plurality of movable parts to rotate in the coordinate axes different from each other in case the plurality of movable parts are operated, and the controller is configured to, in case the plurality of movable parts are operated in a state where the traveling operation pressure and the revolving operation pressure are equal to or less than respective preset operation pressure threshold values, make a determination on which movable part of the plurality of movable parts each of the plurality of inertial sensors is mounted, based upon the sensor output outputted from each of the plurality of inertial sensors and set a corresponding relation between each of the plurality of movable parts and each of the plurality of inertial sensors based upon the determination result.

According to the present invention, it is possible to easily set the mounting location of each of the inertial sensors.

MODE FOR CARRYING OUT THE INVENTION

Hereinafter, an explanation will be in detail made of construction machines according to embodiments in the present invention with reference to the accompanying drawings, by taking a hydraulic excavator as an example thereof.

Figure 1:
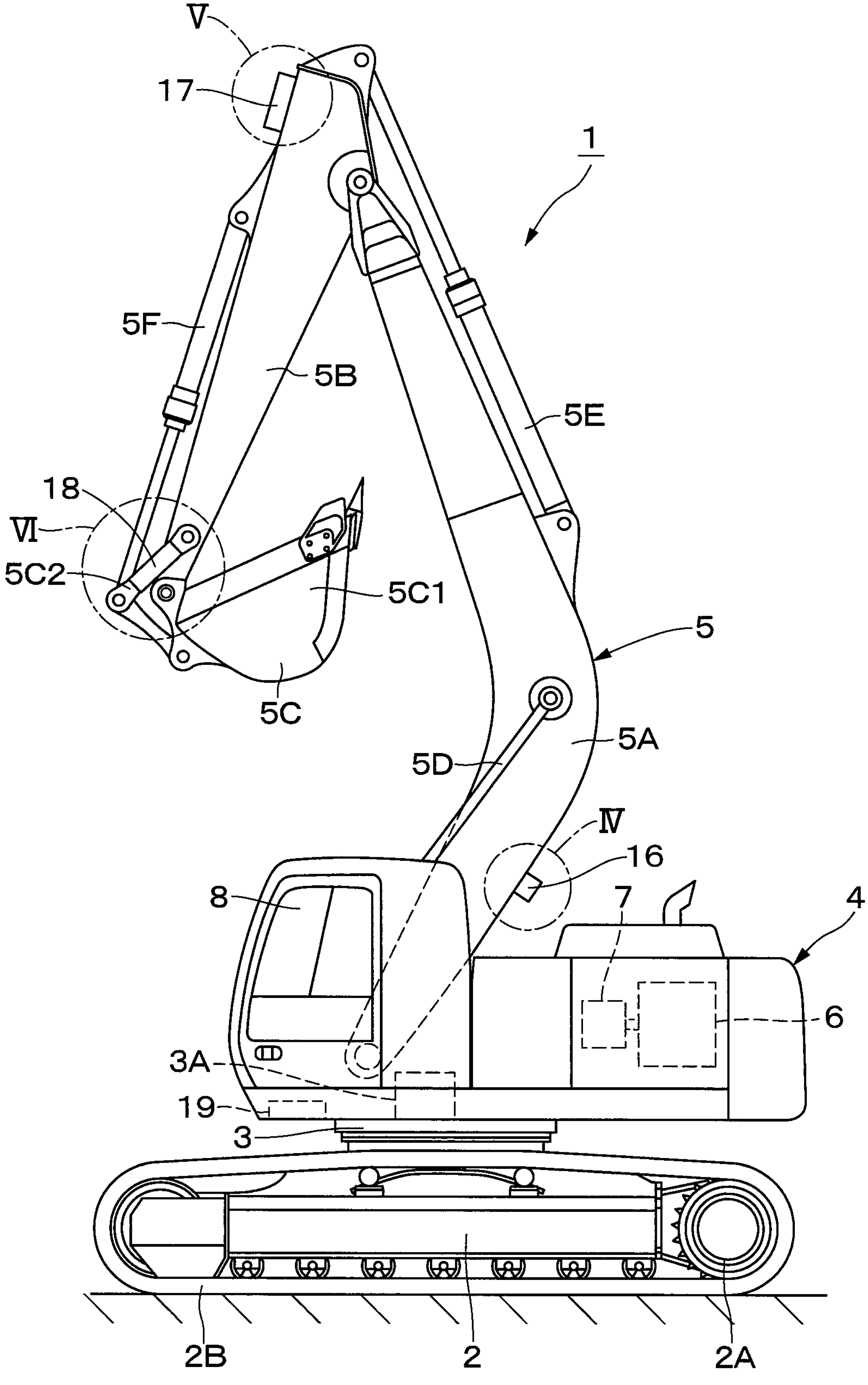
FIG. 1 is a front view illustrating a hydraulic excavator according to a first embodiment of the present invention.
Figure 2:
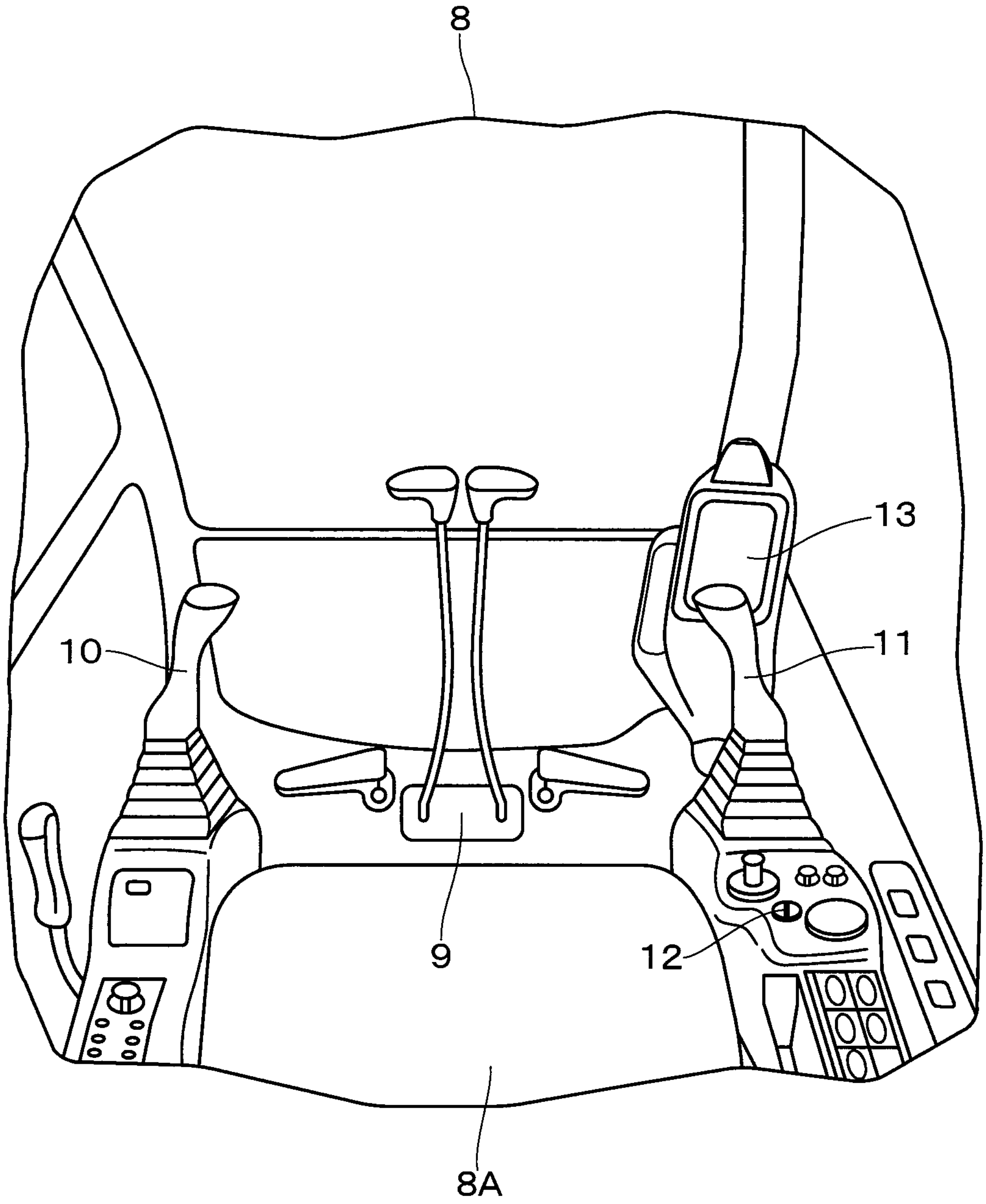
FIG. 2 is a perspective view illustrating the inside of a cab as viewed from an operator's seat side.
Figure 3:
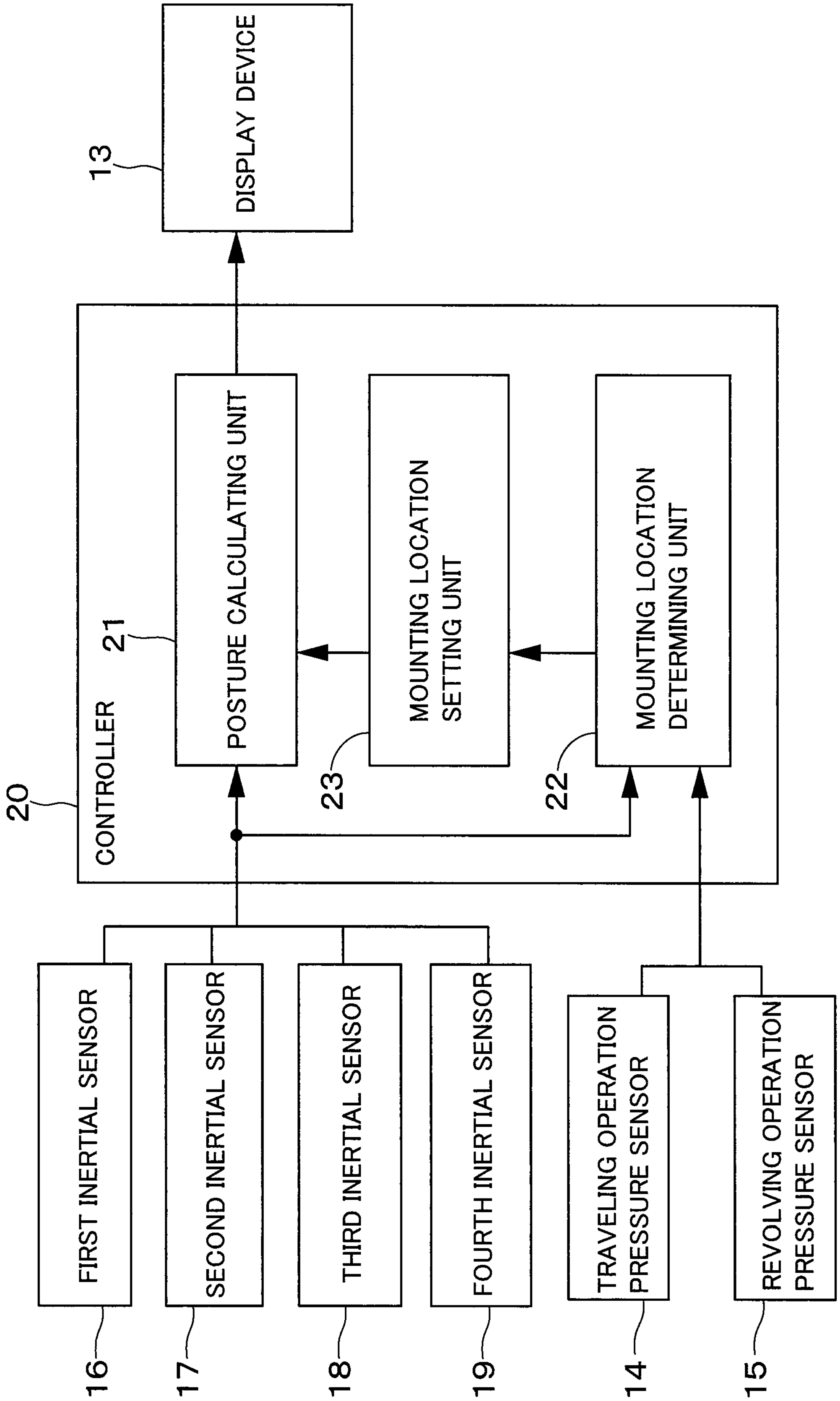
FIG. 3 is a block diagram illustrating the configuration of a controller according to the first embodiment.

First, by referring to FIG. 1 to FIG. 12, an explanation will be made of a hydraulic excavator 1 according to a first embodiment. The hydraulic excavator 1 illustrated in FIG. 1 is provided with an automotive lower traveling structure 2, an upper revolving structure 4 that is mounted on the lower traveling structure 2 through a revolving device 3 to be capable of revolving thereon, and a working mechanism 5 of an articulated structure that is disposed in the front side of the upper revolving structure 4 to perform an excavating work and the like. The lower traveling structure 2 and the upper revolving structure 4 configure a vehicle body of the hydraulic excavator 1.

The lower traveling structure 2 is provided with a hydraulic motor 2A for causing the hydraulic excavator 1 to travel, and a crawler belt 2B that is disposed to be wound in the front-back direction and is driven by the hydraulic motor 2A. The revolving device 3 is provided with a hydraulic motor 3A for revolving the upper revolving structure 4 to the lower traveling structure 2.

The working mechanism. 5 is a front actuator mechanism that is disposed in the front side of the upper revolving structure 4 and is provided with a plurality of movable parts coupled to each other. The working mechanism 5 includes a boom 5A coupled to the upper revolving structure 4 to be capable of lifting and tilting thereto, an arm 5B coupled to a front end side of the boom 5A and a bucket 5C coupled to a front end side of the arm 5B as a working tool. The boom 5A, the arm 5B and the bucket 5C correspond respectively to the movable parts. The boom 5A, the arm 5B and the bucket 5C are respectively driven by a boom cylinder 5D, an arm cylinder 5E and a bucket cylinder 5F as actuators. The working mechanism 5 is driven by hydraulic oil delivered from a hydraulic pump 7 driven by an engine 6.

In this case, the boom 5A rotates in an upper-lower direction by a telescopic movement of the boom cylinder 5D. The arm 5B rotates in a front-back direction by a telescopic movement of the arm cylinder 5E. The bucket 5C includes a bucket main body 5C1 attached to a tip end side of the arm 5B to be rotatable thereto, and a bucket link 5C2 for rotating the bucket main body 5C1 by a telescopic movement of the bucket cylinder 5F. The bucket link 5C2 establishes connection between the arm 5B and the bucket cylinder 5F and connection between the bucket cylinder 5F and the bucket main body 5C1. It should be noted that the working tool of the working mechanism 5 is not limited to the bucket 5C, and may be a grapple, for example.

A cab 8 is disposed in a left front side of the upper revolving structure 4 and is provided internally with an operator's seat 8A. A traveling operation lever device 9 is disposed in the front side of the operator's seat 8A to be operated in the front-back direction for driving the hydraulic motor 2A in the lower traveling structure 2. Left and right operation lever devices 10, 11 are disposed in both of the left and right sides of the operator's seat 8A to be operated in the left-right direction and in the front-back direction for performing a revolving movement of the upper revolving structure 4 and an operation of the working mechanism 5. The left operation lever device 10 controls the hydraulic motor 3A for performing the revolving movement of the upper revolving structure 4 and the arm cylinder 5E for performing a rotational movement of the arm 5B in the working mechanism 5, for example. The right operation lever device 11 controls the boom cylinder 5D for performing a rotational movement of the boom 5A and the bucket cylinder 5F for performing a rotational movement of the bucket 5C in the working mechanism 5, for example.

Figure 10:
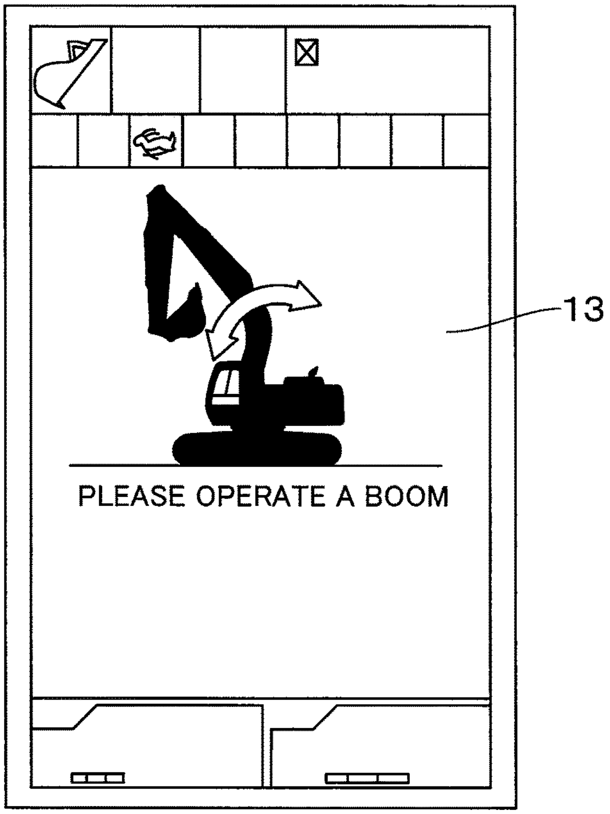
FIG. 10 is an explanatory diagram displayed on the display device at the inertial sensor setting start time.
Figure 11:
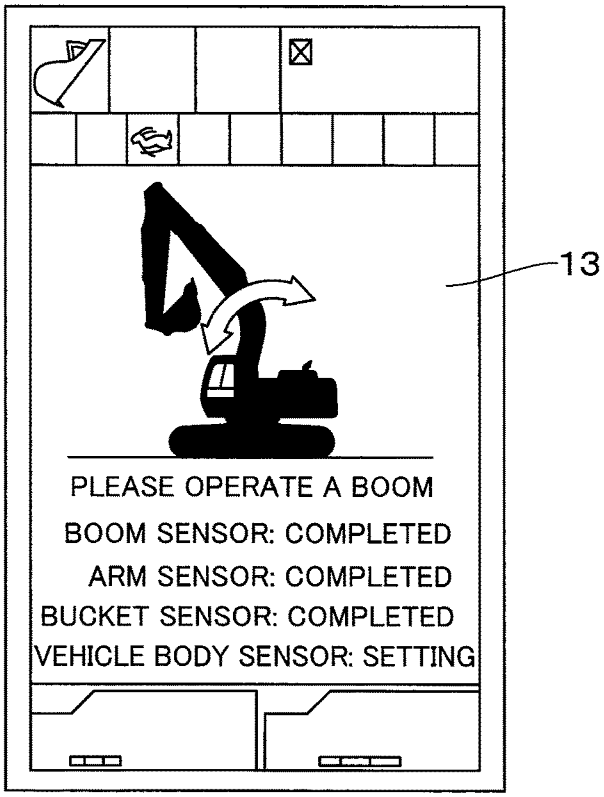
FIG. 11 is an explanatory diagram displayed on the display device in the middle of setting the respective inertial sensors.
Figure 12:
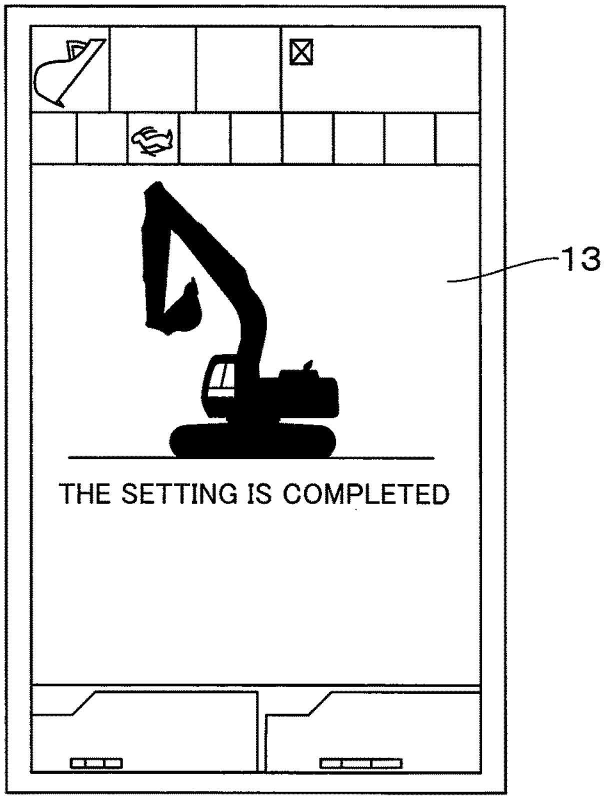
FIG. 12 is an explanatory diagram displayed on the display device when the settings of the respective inertial sensors are completed.

A key switch 12 is disposed in the back side of the right operation lever device 11 to be operated at the time of driving the engine 6. A display device 13 is disposed in a right front side of the operator's seat 8A to indicate a state of the hydraulic excavator 1, such as a remaining amount of fuel or the like and an air temperature in the cab 8. Positional information of the working mechanism 5 is displayed on the display device 13 for assisting in the excavating work of the hydraulic excavator 1, the positional information being calculated from a sensor output of each of inertial sensors 16, 17, 18, 19, which will be described later. Further, as illustrated in FIG. 10 to FIG. 12, a setting state at the time of setting a mounting location of each of the inertial sensors 16, 17, 18, 19, which will be described later, is displayed on the display device 13.

When the traveling operation lever device 9 is operated in the front-back direction to be tilted and rotated, a pilot pressure is supplied to a directional control valve (unillustrated) for controlling a flow amount and a flow direction of hydraulic oil to be supplied to the hydraulic motor 2A in the lower traveling structure 2. When the pilot pressure is supplied to the directional control valve, a valve position of the directional control valve is switched to cause the hydraulic oil from the hydraulic pump 7 to be delivered to the hydraulic motor 2A. As a result, the hydraulic motor 2A is operated, making it possible to cause the hydraulic excavator 1 to travel.

A traveling operation pressure sensor 14 is disposed between the traveling operation lever device 9 and the directional control valve. The traveling operation pressure sensor 14 detects a traveling operation pressure (pilot pressure) for causing the lower traveling structure 2 to travel. That is, the traveling operation pressure sensor 14 detects whether or not the traveling operation lever device 9 is operated to cause the hydraulic excavator 1 to be traveling. The traveling operation pressure sensor 14 outputs the pilot pressure at the time of operating the traveling operation lever device 9 to a later-mentioned controller 20.

When the left operation lever device 10 is operated in the front-back direction to be tilted and rotated, a pilot pressure is supplied to another directional control valve (unillustrated) for controlling a flow amount and a flow direction of hydraulic oil to be supplied to the hydraulic motor 3A in the revolving device 3. When the pilot pressure is supplied to the other directional control valve, a valve position of the other directional control valve is switched to cause the hydraulic oil from the hydraulic pump 7 to be delivered to the hydraulic motor 3A. As a result, the hydraulic motor 3A is operated, making it possible to perform the revolving movement of the upper revolving structure 4.

A revolving operation pressure sensor 15 is disposed between the left operation lever device 10 and the other directional control valve. The revolving operation pressure sensor 15 detects a revolving operation pressure (pilot pressure) for causing the upper revolving structure 4 to revolve. That is, the revolving operation pressure sensor 15 detects whether or not the left operation lever device 10 is operated to cause the upper revolving structure 4 to be revolving. The revolving operation pressure sensor 15 outputs the pilot pressure at the time of operating the left operation lever device 10 to the later-mentioned controller 20. It should be noted that in a case where the right operation lever device 11 is operated to cause the upper revolving structure 4 to revolve, the revolving operation pressure sensor 15 is disposed between the right operation lever device 11 and the other directional control valve.

Next, an explanation will be made of the first, second and third inertial sensors 16, 17, 18 that are mounted on the working mechanism 5, and the fourth inertial sensor 19 that is mounted on the upper revolving structure 4. It should be noted that the first to fourth inertial sensors 16, 17, 18, 19 are composed of inertial sensors with the same specification, but, for descriptive purposes, the explanation will be made assuming that a sensor attached to the boom 5A is defined as the first inertial sensor 16, a sensor attached to the arm 5B is defined as the second inertial sensor 17, a sensor attached to the bucket 5C is defined as the third inertial sensor 18 and a sensor attached to the upper revolving structure 4 is defined as the fourth inertial sensor 19.

Figure 9:
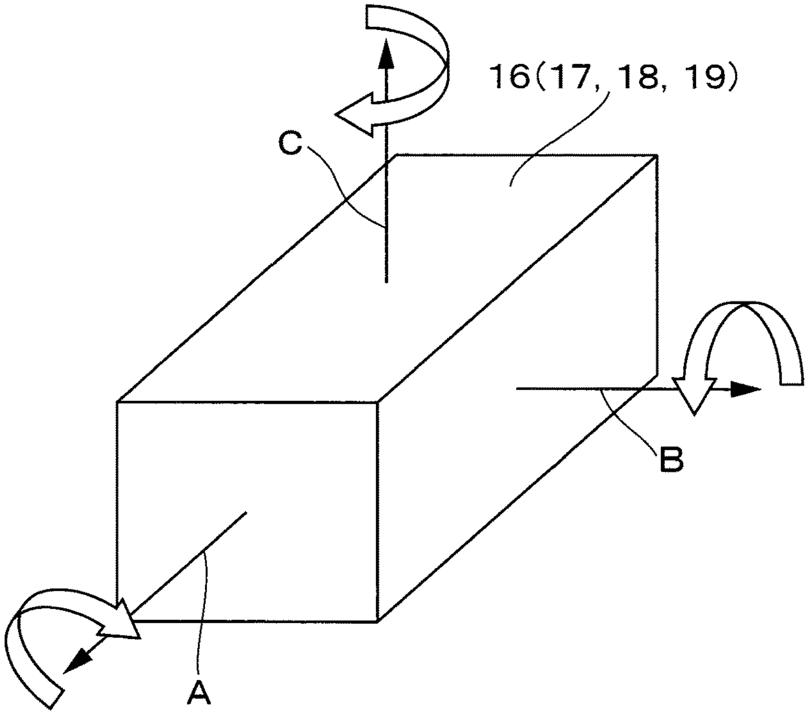
FIG. 9 is an explanatory diagram illustrating three coordinate axes of the respective inertial sensors.

The first inertial sensor 16 is configured to be capable of detecting angular velocities ωa,ωb,ωc of three coordinate axes (a first axis A, a second axis B, and a third axis C) perpendicular to each other, and an acceleration rate. As illustrated in FIG. 9, in the first inertial sensor 16 the first axis A, the second axis B and the third axis C perpendicular to each other are in advance set. In this case, the first inertial sensor 16 detects the angular velocity ωa of the first axis A disposed as a rotational axis, the angular velocity ωb of the second axis B disposed as a rotational axis and the angular velocity ωc of the third axis C disposed as a rotational axis, and outputs these detection values to the later-described controller 20. The second to fourth inertial sensors 17, 18, 19 are also configured to be identical to the first inertial sensor 16.

Figure 4:
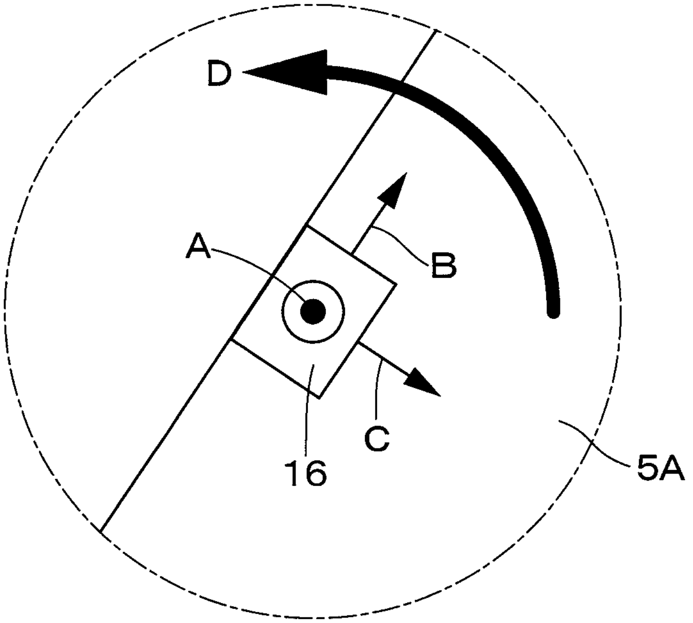
FIG. 4 is a front view illustrating (IV) part in FIG. 1 in an enlarging manner.
Figure 5:
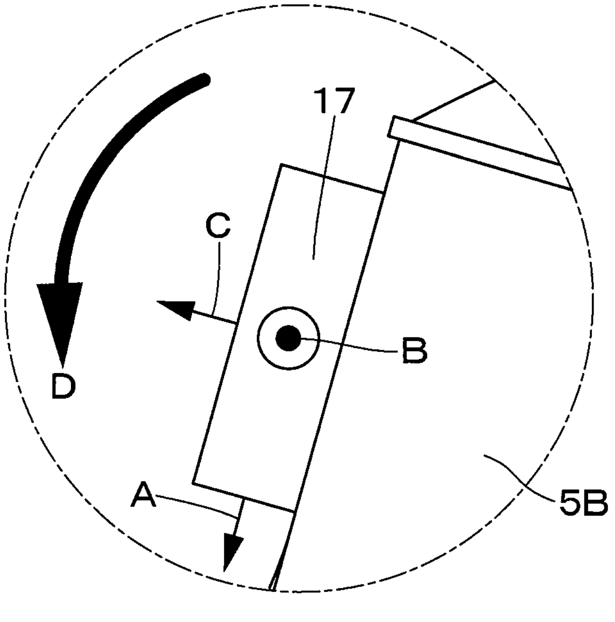
FIG. 5 is a front view illustrating (V) part in FIG. 1 in an enlarging manner.
Figure 6:
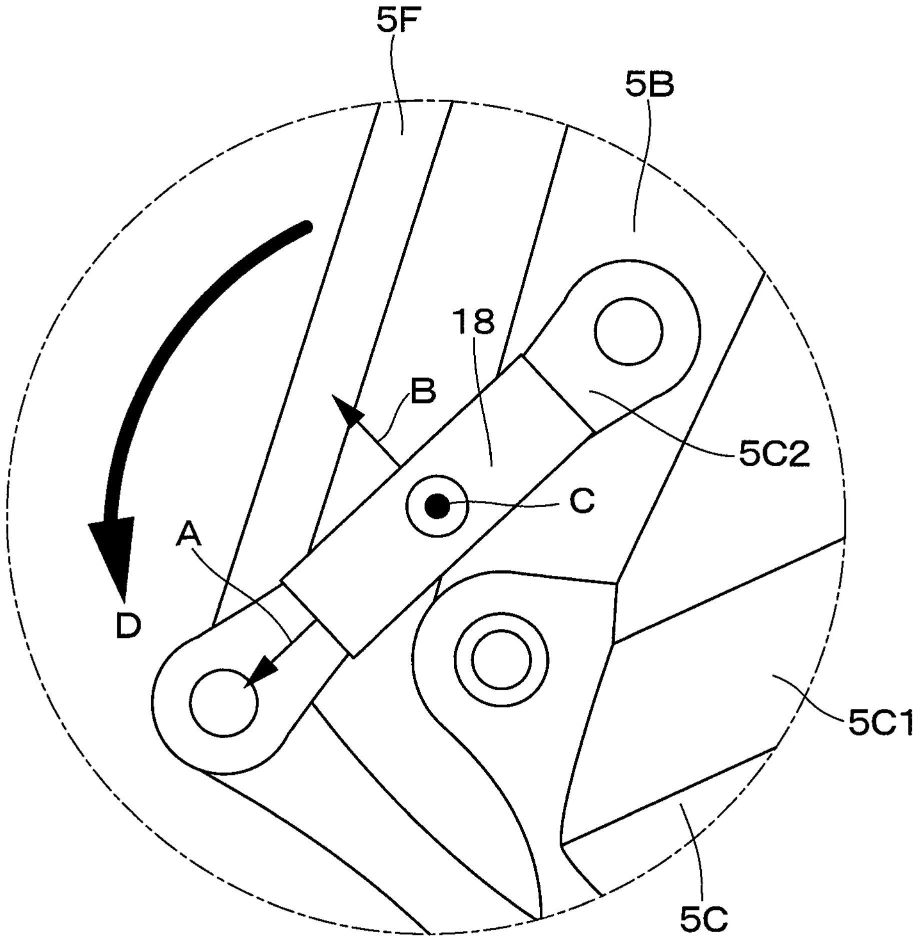
FIG. 6 is a front view illustrating (VI) part in FIG. 1 in an enlarging manner.

As illustrated in FIG. 1 and FIG. 4, the first inertial sensor 16 is attached on a top surface of the boom 5A such that, for example, when the boom 5A is rotated, the angular velocity ωa of a certain magnitude is detected from the first axis A. As illustrated in FIG. 1 and FIG. 5, the second inertial sensor 17 is attached on a top surface of the arm 5B such that, for example, when the arm 5B is rotated, the angular velocity ωb of a certain magnitude is detected from the second axis B. As illustrated in FIG. 1 and FIG. 6, the third inertial sensor 18 is attached to the bucket link 5C2 such that, for example, when the bucket 5C is rotated, the angular velocity ωc of a certain magnitude is detected from the third axis C.

That is, the first inertial sensor 16, the second inertial sensor 17 and the third inertial sensor 18 each are composed of an inertial sensor with the same specification, but with rotation and reverse of the respective sensors by 90 degrees, attaching directions of them are made to be different from each other. It should be noted that since all of the first inertial sensor 16, the second inertial sensor 17, and the third inertial sensor 18 are operated by revolving the boom 5A, the angular velocities ωa, ωb, ωc respectively are detected from each of the inertial sensors 16, 17, 18.

That is, when the boom 5A is caused to lift and tilt in a state where the hydraulic excavator 1 is stopped, the first inertial sensor 16, the second inertial sensor 17 and the third inertial sensor 18 are attached to the respective sections such that determination coordinate axes used for determining the mounting locations differ from each other. The fourth inertial sensor 19 is mounted on the upper revolving structure 4 under the cab 8, for example, and the angular velocities ωa, ωb, ωc are detected therefrom by inclination of the vehicle body.

Figure 7:
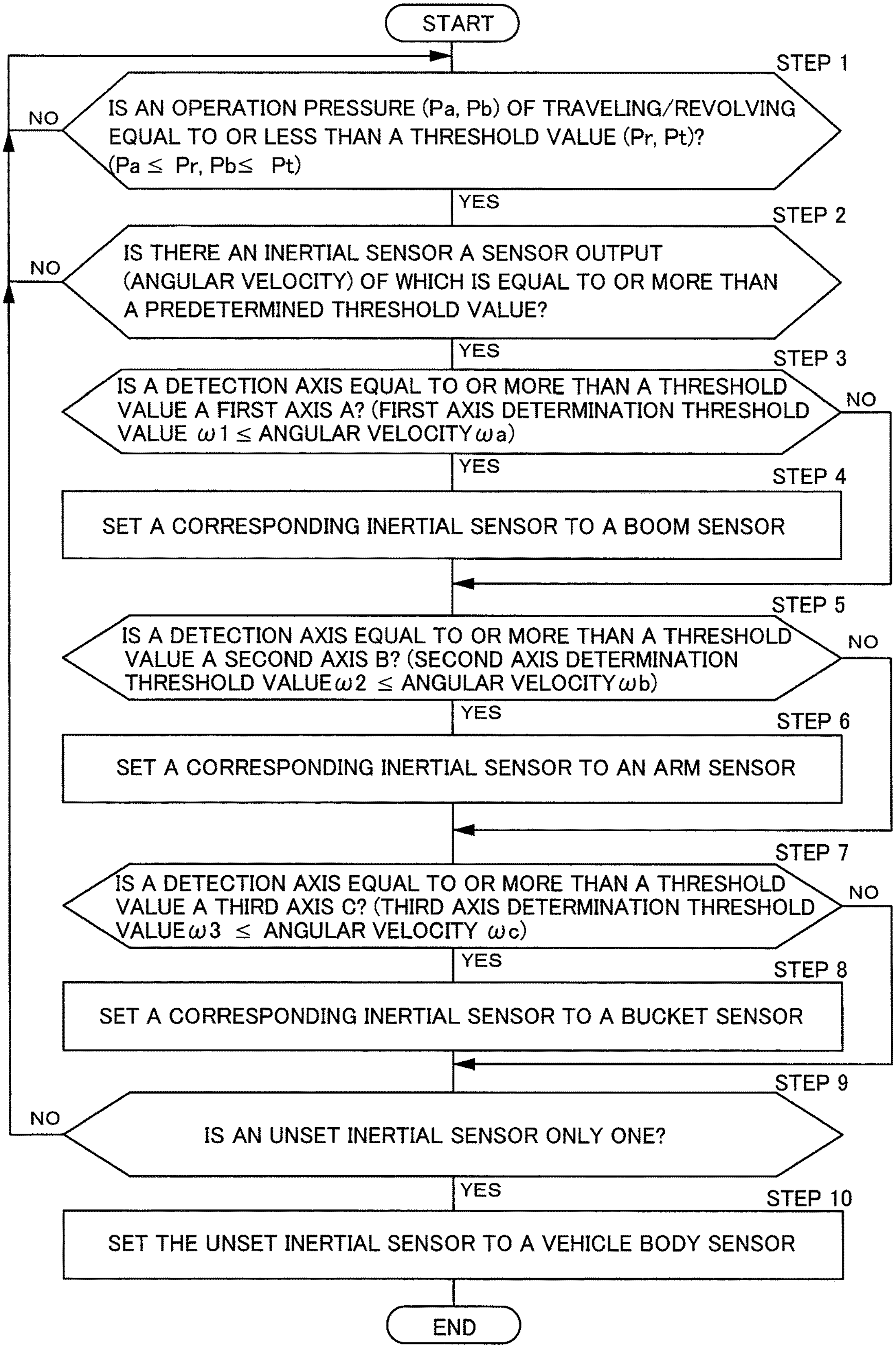
FIG. 7 is a flow chart illustrating mounting location setting processes of respective inertial sensors according to the first embodiment.

The controller 20 is composed of a microcomputer, for example, and is disposed in the upper revolving structure 4. The controller 20 calculates a movement posture of the working mechanism 5 by using the sensor outputs (angular velocities ωa, ωb, ωc) of the first to fourth inertial sensors 16, 17, 18, 19. The controller 20 has an input side to which the traveling operation pressure sensor 14, the revolving operation pressure sensor 15, and the first to fourth inertial sensors 16, 17, 18, 19 are connected and an output side to which the display device 13 and another controller (unillustrated) are connected. The mounting location setting processes of the respective inertial sensors 16, 17, 18, 19 as illustrated in FIG. 7 are stored in the controller 20. The controller 20 includes a posture calculating unit 21, a mounting location determining unit 22 and a mounting location setting unit 23.

The posture calculating unit 21 calculates movement postures of the vehicle body, the boom 5A, the arm 5B and the bucket 5C from the sensor outputs outputted from the first to fourth inertial sensors 16, 17, 18, 19 at the excavating work of the hydraulic excavator 1. The movement postures calculated in the posture calculating unit 21 are outputted to the display device 13. The display device 13 assists in the excavating work by an operator by displaying the movement posture of the hydraulic excavator 1.

In this case, the posture calculating unit 21 is required to recognize to which section each of the first to fourth inertial sensors 16, 17, 18, 19 is attached. Therefore, the controller 20 is provided with the mounting location determining unit 22 and the mounting location setting unit 23 for recognizing the mounting location of each of the inertial sensors 16, 17, 18, 19 before the excavating work of the hydraulic excavator 1.

The mounting location determining unit 22 determines the mounting location of each of the first to fourth inertial sensors 16, 17, 18, 19. Operation pressures Pa, Pb of the traveling operation pressure sensor 14 and the revolving operation pressure sensor 15 are inputted to the mounting location determining unit 22 therefrom. In addition, the sensor outputs (angular velocities ωa, ωb, ωc) of each of the first to fourth inertial sensors 16, 17, 18, 19 are inputted to the mounting location determining unit 22 therefrom.

First, the mounting location determining unit 22 determines whether or not the hydraulic excavator 1 is stopped as a condition for determining the mounting location of each of the first to fourth inertial sensors 16, 17, 18, 19. Specifically, the mounting location determining unit 22 determines whether the hydraulic excavator 1 is stopped or traveling by determining whether or not the traveling operation pressure Pa is equal to or lower than a preset traveling operation pressure threshold value Pr (Pa≤Pr). In addition, the mounting location determining unit 22 determines whether the upper revolving structure 4 of the hydraulic excavator 1 is revolving or stopped by determining whether or not the revolving operation pressure Pb is equal to or lower than a preset revolving operation pressure threshold value Pt (Pb≤Pt).

In this case, the traveling operation pressure threshold value Pr and the revolving operation pressure threshold value Pt are set for avoiding an erroneous determination caused by a variation in an operation pressure detection value due to disturbances such as vibrations of the hydraulic excavator 1, and are in advance stored (memorized) in the mounting location determining unit 22. That is, the traveling operation pressure threshold value Pr and the revolving operation pressure threshold value Pt are set for preventing an erroneous determination caused by noises when the hydraulic excavator 1 is stopped.

Next, the mounting location determining unit 22 determines on which section of the upper revolving structure 4, the boom 5A, the arm 5B and the bucket 5C each of the first to fourth inertial sensors 16, 17, 18, 19 is mounted, based upon the sensor outputs (angular velocities ωa, ωb, ωc) of each of the first to fourth inertial sensors 16, 17, 18, 19. Specifically, the mounting location determining unit 22 determines, when an operator operates the right operation lever device 11 to cause a lifting and tilting movement (rotational movement) of the boom 5A, whether or not each of angular velocities ωa, ωb, ωc detected by the movement of each of the first to third inertial sensors 16, 17, 18 is equal to or more than each of the threshold values ω1, ω2, ω3, and determines the mounting location of each of the inertial sensors 16, 17, 18, 19.

Accordingly, the first axis determination threshold value ω1 corresponding to the angular velocity ωa of the first axis A in each of the inertial sensors 16, 17, 18, 19, the second axis determination threshold value ω2 corresponding to the angular velocity ωb of the second axis B in each of the inertial sensors 16, 17, 18, 19, and the third axis determination threshold value ω3 corresponding to the angular velocity ωc of the third axis C in each of the inertial sensors 16, 17, 18, 19 are stored in the mounting location determining unit 22. These threshold values ω1, ω2, ω3 are set based upon experiments, simulations and the like for avoiding an erroneous determination of the detection value due to disturbances such as vibrations or the like.

In addition, the mounting location determining unit 22 determines the inertial sensor the angular velocity ωa of the first axis A of which is equal to or more than the first axis determination threshold value ω1 (ωa≥ω1) as the boom inertial sensor mounted on the boom 5A. In addition, the mounting location determining unit 22 determines the inertial sensor the angular velocity ωb of the second axis B of which is equal to or more than the second axis determination threshold value ω2 (ωb≥ω2) as the arm inertial sensor mounted on the arm 5B. On the other hand, the mounting location determining unit 22 determines the inertial sensor the angular velocity ωc of the third axis C of which is equal to or more than the third axis determination threshold value ω3 (ωc≥ω3) as the bucket inertial sensor mounted on the bucket 5C.

It should be noted that a relation on which axis of the first axis A to the third axis C the detection axis corresponding to each of the mounting locations should correspond to may be in advance stored in the mounting location determining unit 22 in a case where the mounting direction of each of the inertial sensors 16, 17, 18 is determined, or may be optionally set by an operator or the like. In addition, the mounting location determining unit 22 determines the mounting location of each of the first to third inertial sensors 16, 17, 18 and sets the determined mounting location by the later-described mounting location setting unit 23, and after that, determines the remaining, unset fourth inertial sensor 19 as the vehicle body inertial sensor.

The mounting location setting unit 23 sets the corresponding relation between each of the boom 5A, the arm 5B, the bucket 5C and the vehicle body (upper revolving structure 4) and each of the inertial sensors 16, 17, 18, 19 based on a determination result of the mounting location determining unit 22. As a result, the controller 20 can set together to which position of the boom 5A, the arm 5B, the bucket 5C and the vehicle body each of the first to fourth inertial sensors 16, 17, 18, 19 with the same specification is mounted (attached) only by operating the boom 5A.

The hydraulic excavator 1 according to the first embodiment has the configuration as mentioned above, and hereinafter, an explanation will be made of an operation thereof.

First, an operator gets in the cab 8 and is seated on the operator's seat 8A. In this state, the operator can cause the lower traveling structure 2 to travel by operating the traveling operation lever device 9. On the other hand, by operating the left and right operation lever devices 10, 11, the operator can perform the revolving movement of the upper revolving structure 4 and the excavating work of earth and sand or the like with the working mechanism 5.

In addition, the operator can confirm the tip end position of the bucket 5C displayed on the display device 13 as assistance in the excavating work. In this case, the posture calculating unit 21 in the controller 20 calculates the movement posture of the hydraulic excavator 1 from the sensor outputs (angular velocities ωa, ωb, ωc) of each of the first to fourth inertial sensors 16, 17, 18, 19 that are mounted on the boom 5A, the arm 5B, the bucket 5C and the upper revolving structure 4 to confirm the tip end position of the bucket 5C.

Incidentally, in a case of calculating the movement posture, the posture calculating unit 21 in the controller 20 is required to recognize in which position each of the first to fourth inertial sensors 16, 17, 18, 19 is mounted. Therefore, there may be considered a method for performing the settings of the respective inertial sensors by attaching them one by one. In this method, however, a series of setting works of attaching, setting and removing of the inertial sensor have to be performed by the mounting number of the inertial sensors, possibly posing a problem with hours and labors required for the setting works. In addition, it is assumed to make the setting of the mounting location unnecessary by making each of the inertial sensors the exclusive inertial sensor the mounting location of which is designated. However, that possibly causes the mix-up of the mounting location of each of the inertial sensors. In addition, for dealing with a failure of each of the inertial sensors, the inertial sensors exclusive for the respective mounting locations have to be prepared in stock. As a result, costs in inventory management and storage of the respective inertial sensors possibly increase.

Therefore, in the present embodiment, the mounting location of each of the inertial sensors 16, 17, 18, 19 can be set together only by performing the rotational movement of the boom 5A before the excavating work of the hydraulic excavator 1, for example. Specifically, the first inertial sensor 16 mounted on the boom 5A is mounted on the boom 5A such that, for example, when the boom 5A is rotated, the angular velocity ωa of the first axis A is equal to or more than the first axis determination threshold value ω1. On the other hand, the second inertial sensor 17 mounted on the arm 5B is mounted on the arm 5B such that, for example, when the boom 5A is rotated, the angular velocity ωb of the second axis B is equal to or more than the second axis determination threshold value ω2.

In addition, the third inertial sensor 18 mounted on the bucket 5C is mounted on the bucket 5C such that, for example, when the boom 5A is rotated, the angular velocity ωc of the third axis C is equal to or more than the third axis determination threshold value ω3. That is, each of the inertial sensors 16, 17, 18 is attached to each section such that the angular velocity of a certain magnitude is detected by each of the different detection axes of each sensor.

Next, an explanation will be made of the mounting location setting processing by the controller 20 with reference to FIG. 7. It should be noted that the mounting location setting processing illustrated in FIG. 7 is executed within a certain time after the key switch 12 is turned on, for example.

First, at step 1 it is determined whether or not an operation pressure of traveling/revolving is equal to or less than a threshold value. That is, the mounting location determining unit 22 in the controller 20 determines whether or not a traveling operation pressure Pa outputted from the traveling operation pressure sensor 14 is equal to or less than a traveling operation pressure threshold value Pr (Pa≤Pr), and thereby, determines that the hydraulic excavator 1 is in a stop state. In addition, the mounting location determining unit 22 determines whether or not a revolving operation pressure Pb outputted from the revolving operation pressure sensor 15 is equal to or less than a revolving operation pressure threshold value Pt (Pb≤Pt), and thereby, determines that the upper revolving structure 4 is in a non-revolving state.

In addition, in a case where at step 1, "YES" is determined, that is, the hydraulic excavator 1 is determined to be in the stop state and in the non-revolving state, the process goes to step 2. On the other hand, in a case where at step 1, "NO" is determined, that is, the hydraulic excavator 1 is determined to be traveling or revolving, the process waits until the traveling or the revolving of the hydraulic excavator 1 is stopped.

At step 2, it is determined whether or not there is the inertial sensor the sensor output of which is equal to or more than the threshold value. In this case, an operator who has confirmed the display of prompting the operation of the boom 5A as illustrated in FIG. 10 operates the right operation lever device 11 to cause the boom 5A to rotate. The mounting location determining unit 22 determines whether or not any of the sensor outputs (angular velocities ωa, ωb, ωc) of the first to third inertial sensors 16, 17, 18 is equal to or more than the threshold value ω1, ω2, ω3. In a case where at step 2 it is determined that "YES" is determined, that is, it is determined that there is the inertial sensor that has outputted the detection value of the threshold value ω1, ω2, ω3 or more, the process goes to step 3. On the other hand, in a case where it is determined that there is not the inertial sensor that has outputted the detection value of the threshold value ω1, ω2, ω3 or more, the process goes back to step 1.

At step 3, it is determined whether or not the detection axis having reached the threshold value or more is the first axis. That is, the mounting location determining unit 22 determines whether or not there is the angular velocity ωa (ω1≤ωa) of the first axis A which is detected to be the first axis determination threshold value ω1 or more. In addition, in a case where at step 3, "YES" is determined, that is, the angular velocity ωa of the first axis A is determined to be the first axis determination threshold value ω1 or more, the process goes to step 4. On the other hand, in a case where at step 3 "NO" is determined, that is, the angular velocity ωa of the first axis A is determined to be less than the first axis determination threshold value ω1, the process goes to step 5.

At step 4, the corresponding inertial sensor is set to the boom sensor. That is, the mounting location setting unit 23 in the controller 20 sets the first inertial sensor 16 in which the angular velocity ωa of the first axis A is detected to be the first axis determination threshold value ω1 or more, as the boom inertial sensor mounted on the boom 5A.

At the next step 5, it is determined whether or not the detection axis having reached the threshold value or more is the second axis. That is, the mounting location determining unit 22 determines whether or not there is the angular velocity ωb (ω2≤ωb) of the second axis B which is detected to be equal to or more than the second axis determination threshold value ω2. In addition, in a case where at step 5 "YES" is determined, that is, the angular velocity ωb of the second axis B is determined to be equal to or more than the second axis determination threshold value ω2, the process goes to step 6. On the other hand, in a case where at step 5 "NO" is determined, that is, the angular velocity ωb of the second axis B is determined to be less than the second axis determination threshold value ω2, the process goes to step 7.

At step 6, the corresponding inertial sensor is set to the arm sensor. That is, the mounting location setting unit 23 in the controller 20 sets the second inertial sensor 17 in which the angular velocity ωb of the second axis B is detected to be equal to or more than the second axis determination threshold value ω2, as the arm inertial sensor mounted on the arm 5B.

At the next step 7, it is determined whether or not the detection axis having reached the threshold value or more is the third axis. That is, the mounting location determining unit 22 determines whether or not there is the angular velocity ωc (ω3≤ωc) of the third axis C which is detected to be equal to or more than the third axis determination threshold value ω3. In addition, in a case where at step 7 "YES" is determined, that is, the angular velocity ωc of the third axis C is determined to be equal to or more than the third axis determination threshold value ω3, the process goes to step 8. On the other hand, in a case where at step 7 "NO" is determined, that is, the angular velocity ωc of the third axis C is determined to be less than the third axis determination threshold value ω3, the process goes to step 9.

At step 8, the corresponding inertial sensor is set to the bucket sensor. That is, the mounting location setting unit 23 of the controller 20 sets the third inertial sensor 18 in which the angular velocity ωc of the third axis C is detected to be equal to or more than the third axis determination threshold value ω3, as the bucket inertial sensor mounted on the bucket 5C.

At the next step 9, it is determined whether or not the unset inertial sensor is only one. That is, the mounting location determining unit 22 determines whether or not the mounting location setting unit 23 sets the first inertial sensor 16 as the boom inertial sensor, sets the second inertial sensor 17 as the arm inertial sensor, and sets the third inertial sensor 18 as the bucket inertial sensor. In addition, in a case where at step 9, "YES" is determined, that is, the unset inertial sensor is determined to be only one, the process goes to step 10. On the other hand, in a case where at step 9, "NO" is determined, that is, the unset inertial sensor is determined to be two or more, the process goes back to step 1.

It should be noted that, as illustrated in FIG. 11, a setting condition of each of the inertial sensors 16, 17, 18, 19 is displayed on the display device 13 between step 3 and step 9. Thereby, since it is possible to recognize the unset inertial sensor 16, 17, 18 or 19, it is possible to specify the inertial sensor that cannot be set due to a failure, for example.

At step 10, the unset inertial sensor is set as the vehicle body inertial sensor. That is, the mounting location setting unit 23 in the controller 20 sets the fourth inertial sensor 19 which has finally remained among the first to fourth inertial sensors 16, 17, 18, 19 as the vehicle body inertial sensor mounted on the upper revolving structure 4. In this case, the display that the settings of all the inertial sensors 16, 17, 18, 19 are completed is made on the display device 13.

Figure 8:
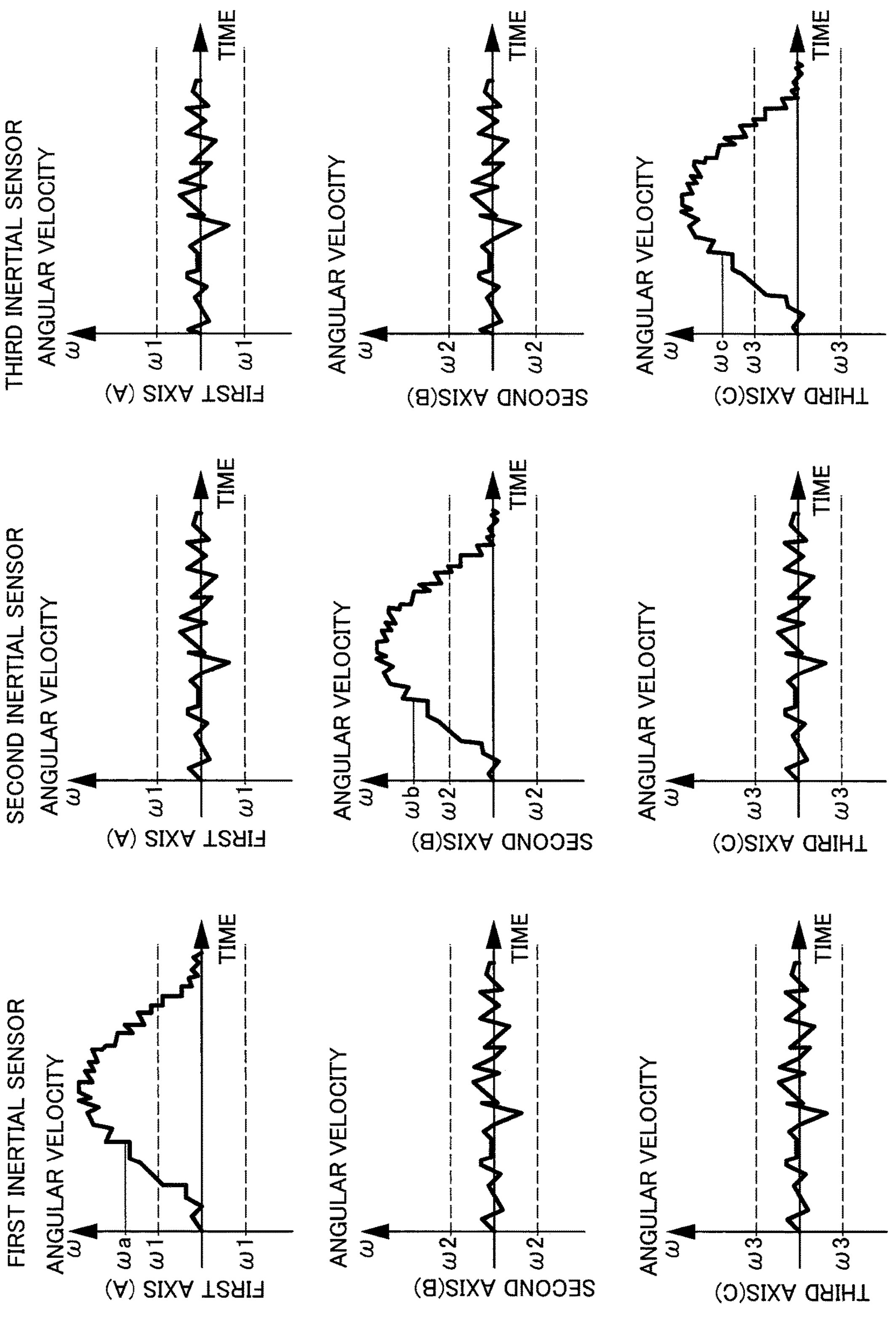
FIG. 8 is a characteristic line diagram illustrating sensor outputs outputted from the respective inertial sensors at the time of operating a working mechanism.

Next, an explanation will be made of the sensor outputs (angular velocities ωa, ωb, ωc) outputted from the first to third inertial sensors 16, 17, 18 at the time of rotating the boom 5A in a case of executing the mounting location setting processing with reference to FIG. 8.

First, when an operator rotates the boom 5A downwards, as illustrated in FIG. 4 to FIG. 6 the first to third inertial sensors 16, 17, 18 each move in an arrow D direction. In this case, the sensor output outputted from the first inertial sensor 16 is detected to be a value equal to or more than the first axis determination threshold value ω1 as the angular velocity ωa of the first axis A. On the other hand, the angular velocity ωb of the second axis B outputted from the first inertial sensor 16 is detected to be a value less than the second axis determination threshold value ω2, and the angular velocity ωc of the third axis C is detected to be a value less than the third axis determination threshold value ω3.

In addition, the sensor output outputted from the second inertial sensor 17 is detected to be a value equal to or more than the second axis determination threshold value ω2 as the angular velocity ωb of the second axis B. On the other hand, the angular velocity ωa of the first axis A outputted from the second inertial sensor 17 is detected to be a value less than the first axis determination threshold value ω1, and the angular velocity ωc of the third axis C is detected to be a value less than the third axis determination threshold value ω3.

In addition, the sensor output outputted from the third inertial sensor 18 is detected to be a value equal to or more than the third axis determination threshold value ω3 as the angular velocity ωc of the third axis C. On the other hand, the angular velocity ωa of the first axis A is detected to be a value less than the first axis determination threshold value ω1, and the angular velocity ωb of the second axis B is detected to be a value less than the second axis determination threshold value ω2. That is, the first to third inertial sensors 16, 17, 18 set the coordinate axes different from each other as the determination coordinate axes. As a result, the mounting location determining unit 22 in the controller 20 can establish a corresponding relation between the inertial sensor corresponding to the detection axis and the mounting location.

Thus, the construction machine (hydraulic excavator 1) in the first embodiment is provided with the automotive lower traveling structure 2, the upper revolving structure 4 mounted on the lower traveling structure 2 to be capable of revolving thereon, the plurality of movable parts (working mechanism 5) that are disposed in the upper revolving structure 4 and are coupled to each other, the plurality of inertial sensors with the same specification (the first inertial sensor 16, the second inertial sensor 17 and the third inertial sensor 18) that are respectively mounted on each of the plurality of movable parts to be capable of detecting the angular velocities (ωa, ωb, ωc) of the three coordinate axes (the first axis A, the second axis B and the third axis C) perpendicular to each other, the controller 20 configured to calculate the movement posture of each of the movable parts by using the sensor output of each of the plurality of inertial sensors, the traveling operation pressure sensor 14 that detects the traveling operation pressure Pa for causing the lower traveling structure 2 to travel, and the revolving operation pressure sensor 15 that detects the revolving operation pressure Pb for revolving the upper revolving structure 4.

The plurality of inertial sensors are respectively mounted on the plurality of movable parts to rotate in the coordinate axes different from each other when the plurality of movable parts are operated. The controller 20 is configured to, when the plurality of movable parts are operated in a state where the traveling operation pressure Pa and the revolving operation pressure Pb are equal to or less than the respective preset operation pressure threshold values (the traveling operation pressure threshold value Pr and the revolving operation pressure threshold value Pt), make a determination on which movable part of the plurality of movable parts each of the plurality of inertial sensors is mounted, based upon the sensor outputs outputted from the plurality of inertial sensors and set the corresponding relation between each of the plurality of movable parts and each of the plurality of inertial sensors based upon the determination result.

Thereby, since it is possible to easily set where the inertial sensors with the same specification mounted in the plurality of locations are respectively mounted, the workability on the setting work of the sensor mounting location can improve. In addition, since it is possible to mount the inertial sensor to any position, it is possible to suppress occurrence of the mix-up of the mounting location. In addition, it is possible to cut down on costs of the inventory management and the like.

In addition, the construction machine (hydraulic excavator 1) according to the first embodiment is provided with the display device 13 for displaying information. The display device 13 displays the setting information of each of the inertial sensors set by the controller 20. Thereby, the operator can recognize the setting condition of each of the inertial sensors 16 to 19.

In addition, the plurality of movable parts include the boom 5A coupled to the upper revolving structure 4 to be capable of lifting and tilting thereto, the arm 5B coupled to the tip end side of the boom 5A, and the working tool (bucket 5C) coupled to the tip end side of the arm 5B. The plurality of inertial sensors 16 to 18 include the first inertial sensor 16 that is mounted on the boom 5A and uses the first axis A of the three coordinate axes as the determining coordinate axis, the second inertial sensor 17 that is mounted on the arm 5B and uses the second axis B of the three coordinate axes as the determining coordinate axis, and the third inertial sensor 18 that is mounted on the working tool and uses the third axis C of the three coordinate axes as the determining coordinate axis. The controller 20, in a case of operating the plurality of movable parts, determines the first inertial sensor 16 as the boom inertial sensor when the angular velocity ωa of the first axis A is equal to or more than the first axis determination threshold value ω1, determines the second inertial sensor 17 as the arm inertial sensor when the angular velocity ωb of the second axis B is equal to or more than the second axis determination threshold value ω2, and determines the third inertial sensor 18 as the working tool inertial sensor when the angular velocity ωc of the third axis C is equal to or more than the third axis determination threshold value ω3.

As a result, since it is possible to set the mounting locations of the first to third inertial sensors 16, 17, 18 together only by rotating the boom 5A, for example, it is possible to improve the workability on the mounting location setting work of each of the inertial sensors 16, 17, 18.

Figure 13:
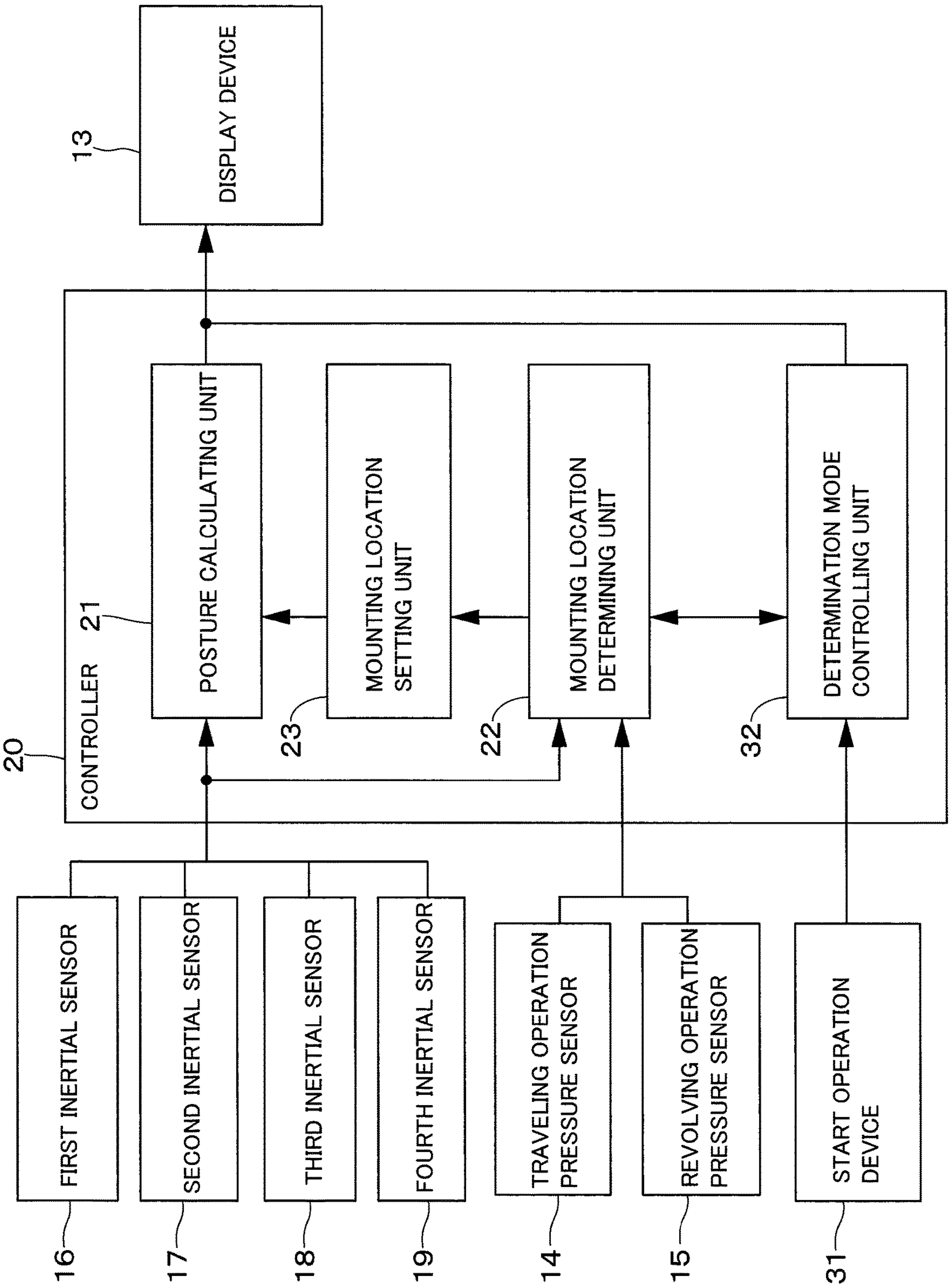
FIG. 13 is a block diagram illustrating the configuration of a controller according to a second embodiment of the present invention.
Figure 14:
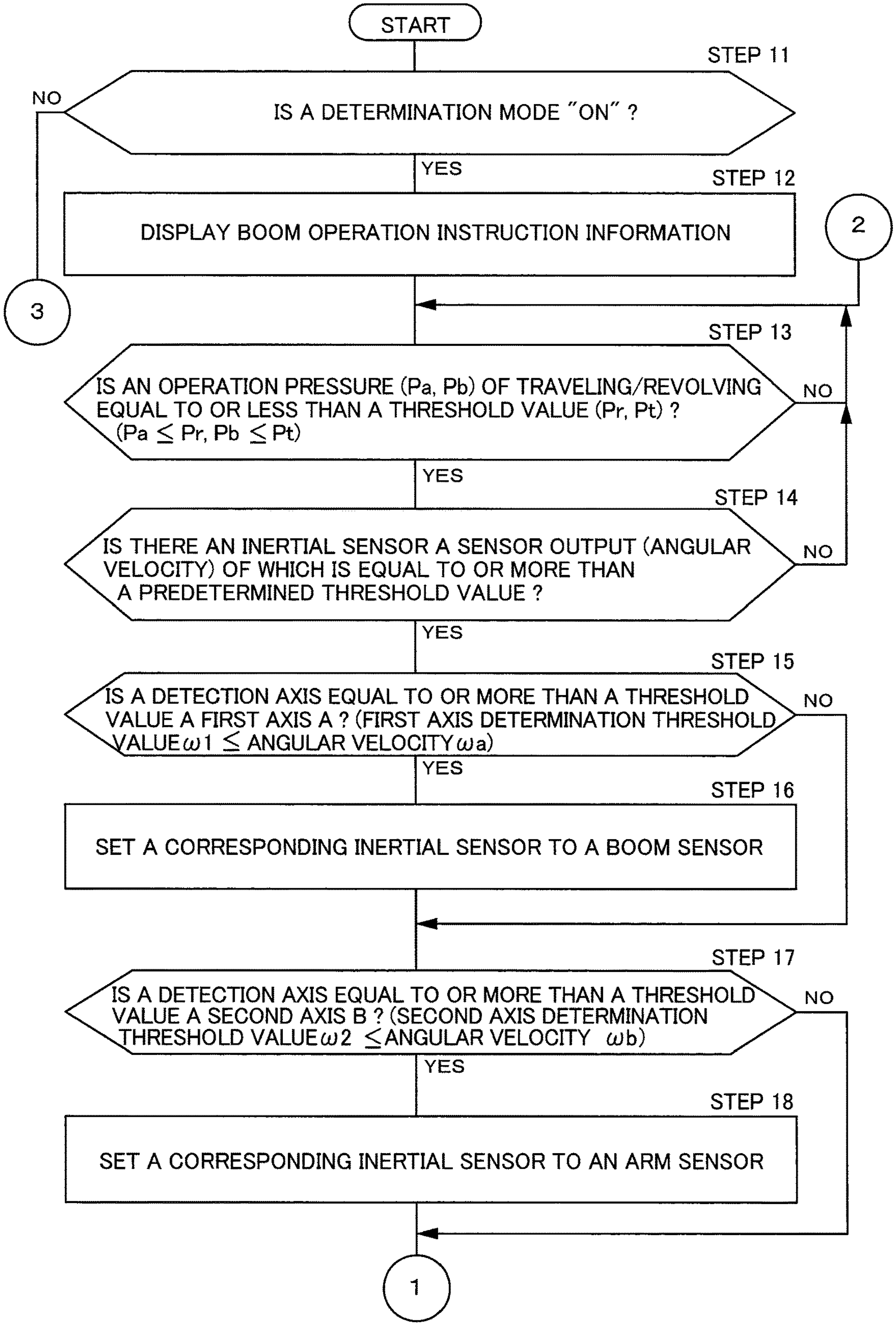
FIG. 14 is a flow chart illustrating mounting location setting processes of respective inertial sensors according to the second embodiment.
Figure 15:
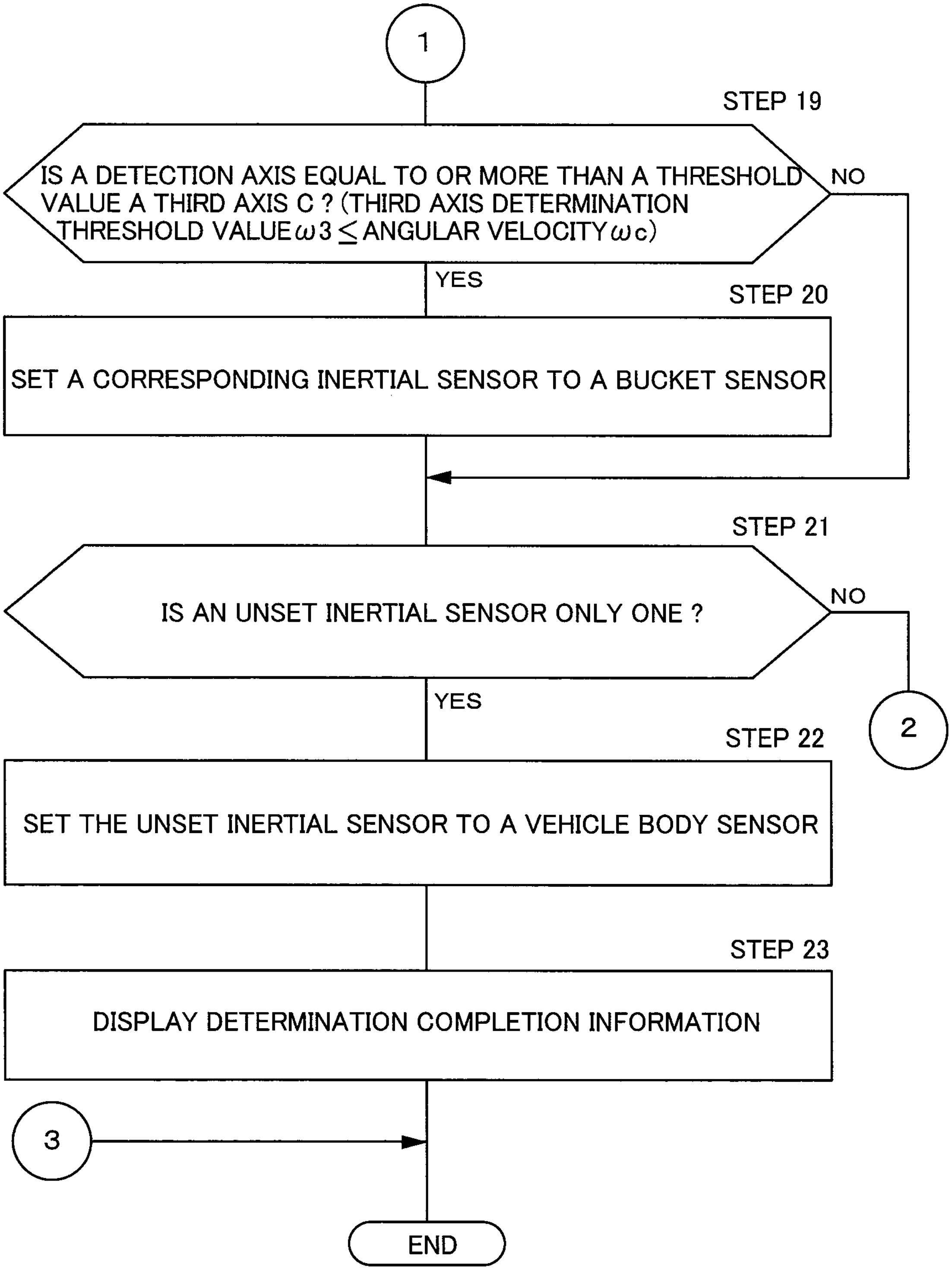
FIG. 15 is a flow chart illustrating processes subsequent to the processes in FIG. 14.

Next, FIG. 13 to FIG. 15 illustrate a second embodiment in the present invention. The second embodiment is characterized in disposing a start operation device to be operated at the time of starting mounting location setting processing. It should be noted that in the second embodiment, components identical to those in the first embodiment are referred to as identical reference numerals, and the explanation is omitted.

A start operation device 31 is operated at the time of starting the setting of a mounting location of each of the inertial sensors 16, 17, 18, 19. The start operation device 31 is disposed around the display device 13 or the key switch 12 in the cab 8, for example. The start operation device 31 is connected to a determination mode controlling unit 32 in the controller 20 and is turned on at the time an operator sets the mounting location of each of the inertial sensors 16 to 19.

The determination mode controlling unit 32 is disposed in the controller 20. The determination mode controlling unit 32 receives an output signal of an ON-operation from the start operation device 31 to start control processes for determination and setting. That is, when an operator performs the ON-operation to the start operation device 31, a determination mode for the controller 20 to determine the mounting location of each of the inertial sensors 16, 17, 18, 19 is switched from OFF to ON. In addition, the determination mode controlling unit 32 outputs progress information of the determination process and operation instruction information in the mounting location determining unit 22 to the display device 13.

Next, an explanation will be made of the mounting location setting processing by the controller 20 with reference to FIG. 14 and FIG. 15. It should be noted that the mounting location setting processing illustrated in FIG. 14 and FIG. 15 is repeatedly executed within a predetermined time (cycle) after the start operation device 31 is turned on, for example.

At step 11, it is determined whether or not the determination mode is "ON". That is, the determination mode controlling unit 32 in the controller 20 determines whether or not the ON-operation of the start operation device 31 by the operator is detected. In addition, in a case where at step 11, "YES" is determined, that is, the determination mode is determined to be "ON", the process goes to step 12. On the other hand, in a case where at step 11, "NO" is determined, that is, the determination mode is determined to be "OFF", the process goes to "End" without executing the mounting location setting processing.

At step 12, the boom operation instruction information is displayed. That is, the determination mode controlling unit 32 outputs that the determination mode is switched to "ON" to the display device 13. In addition, for example, as illustrated in FIG. 10, image information and character information for promoting the operator to perform the rotational movement of the boom 5A are displayed on the display device 13. Thereby, since the operator can recognize what will be operated the next, it is possible to smoothly proceed with the mounting location setting processing. In addition, since the control processes from the next step 13 to step 22 are similar to those from step 1 to step 10 illustrated in FIG. 7 in the first embodiment, the explanation is omitted.

At step 23, determination completion information is displayed. That is, in a case where the setting of the mounting location of each of the inertial sensors 16, 17, 18, 19 is completed, the determination mode controlling unit 32 in the controller 20 switches the determination mode from "ON" to "OFF", and outputs a signal thereof to the display device 13. In addition, for example, as illustrated in FIG. 12, the display that the mounting location setting of each of the inertial sensors 16, 17, 18, 19 is completed is made on the display device 13. It should be noted that in a case where the mounting location setting processing is interrupted or cancelled due to the OFF-operation of the start operation device 31 by the operator, a predetermined time elapsing without progress of the control process or the like, the display that the mounting location setting processing is interrupted or cancelled may be made on the display device 13.

Thus, the second embodiment as configured in this manner is provided with the start operation device 31 to be operated at the time of starting the setting of the mounting location of each of the inertial sensors 16, 17, 18, 19. The controller 20 sets the mounting location of each of the inertial sensors 16, 17, 18, 19 when the start operation device 31 is operated. Thereby, in the second embodiment, the operational effect similar to that in the first embodiment can be obtained and the setting of the mounting location of each of the inertial sensors 16, 17, 18, 19 can be started with an intent of the operator.

Figure 16:
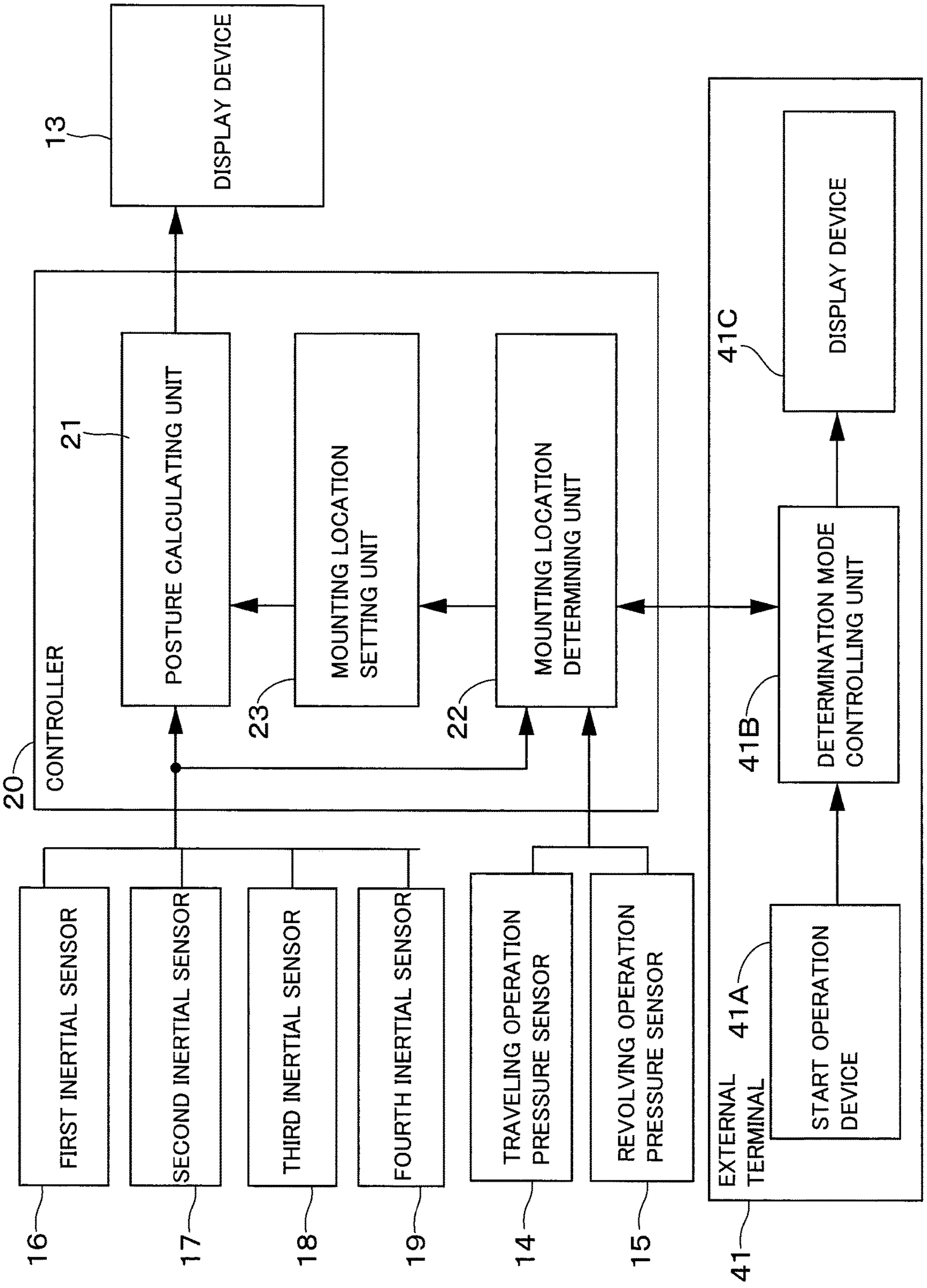
FIG. 16 is a block diagram illustrating the configuration of a controller according to a modification.

It should be noted that in the above-mentioned second embodiment, the explanation is made by taking a case where the start operation device 31 is disposed in the cab 8, as an example. However, the present invention is not limited thereto, but, for example, as a modification illustrated in FIG. 16 an external terminal 41 such as a mobile terminal provided with a start operation device 41A, a determination mode controlling unit 41B and a display device 41C may be connected to the controller 20 wired or wirelessly to execute the mounting location setting processing. In addition, the mounting location setting processing may be executed in any of the start operation device 31 in the cab 8 or the external terminal 41.

In addition, in the above-mentioned first embodiment, the explanation is made by taking a case where the boom 5A is caused to rotate, thereby operating the first to third inertial sensors 16, 17, 18, as an example. However, the present invention is not limited thereto, but, for example, after setting only the third inertial sensor 18 by rotating only the bucket 5C, the second inertial sensor 17 may be set by rotating the arm 5B, and after that, the boom 5A may be caused to rotate, thereby setting the first inertial sensor 16. This configuration may be similarly applied to the second embodiment and the modification.

In addition, in the above-mentioned embodiment, the explanation is made by taking a case where the first inertial sensor 16 is attached on the top surface of the boom 5A, as an example. However, the present invention is not limited thereto, but the first inertial sensor 16 may be attached on a lower surface or a side surface of the boom 5A, for example. This configuration may be similarly applied to the second inertial sensor 17 attached to the arm 5B and the third inertial sensor 18 attached to the bucket 5C.

In addition, in the above-mentioned embodiment, the explanation is made by taking the hydraulic excavator 1 as the construction machine, as an example. The present invention is not limited thereto, but may be applied to various kinds of construction machines such as a wheel loader.

DESCRIPTION OF REFERENCE NUMERALS

1: Hydraulic excavator (Construction machine)
2: Lower traveling structure
4: Upper revolving structure
5: Working mechanism
5A: Boom (Movable part)
5B: Arm (Movable part)
5C: Bucket (Movable part)
13, 41C: Display device
14: Traveling operation pressure sensor
15: Revolving operation pressure sensor
16: First inertial sensor
17: Second inertial sensor
18: Third inertial sensor
19: Fourth inertial sensor
20: Controller
21: Posture calculating unit
22: Mounting location determining unit
23: Mounting location setting unit
31, 41A Start operation device
A: First axis
B: Second axis
C: Third axis
ωa: Angular velocity of the first axis
ωb: Angular velocity of the second axis
ωc: Angular velocity of the third axis
ω1: First axis determination threshold value
ω2: Second axis determination threshold value
ω3: Third axis determination threshold value
Pa: Traveling operation pressure
Pb: Revolving operation pressure
Pr: Traveling operation pressure threshold value
Pt: Revolving operation pressure threshold value

The invention claimed is:

1. A construction machine comprising:

an automotive lower traveling structure;

an upper revolving structure mounted on the lower traveling structure to be capable of revolving thereon;

a working mechanism that is disposed in the upper revolving structure and is provided with a plurality of movable parts coupled to each other;

a plurality of inertial sensors with the same specification that are respectively mounted on each of the plurality of movable parts to be capable of detecting angular velocities of three coordinate axes perpendicular to each other;

a controller configured to calculate a posture of each of the movable parts by using a sensor output of each of the plurality of inertial sensors;

a traveling operation pressure sensor that detects a traveling operation pressure for causing the lower traveling structure to travel; and a revolving operation pressure sensor that detects a revolving operation pressure for revolving the upper revolving structure, characterized in that:

the plurality of inertial sensors are respectively mounted on the plurality of movable parts to rotate in the coordinate axes different from each other in case the plurality of movable parts are operated; and the controller is configured to, in case the plurality of movable parts are operated in a state where the traveling operation pressure and the revolving operation pressure are equal to or less than respective preset operation pressure threshold values, make a determination on which movable part of the plurality of movable parts each of the plurality of inertial sensors is mounted, based upon the sensor output outputted from each of the plurality of inertial sensors and set a corresponding relation between each of the plurality of movable parts and each of the plurality of inertial sensors based upon the determination result.

2. The construction machine according to claim 1, further comprising:

a display device configured to display information, wherein the display device displays setting information of each of the inertial sensors set by the controller.

3. The construction machine according to claim 1, further comprising:

a start operation device configured to be operated at the time of starting the setting of a mounting location of each of the inertial sensors, wherein the controller sets the mounting location of each of the inertial sensors in case the start operation device is operated.

4. The construction machine according to claim 1, wherein the plurality of movable parts include:

a boom coupled to the upper revolving structure;

an arm coupled to a tip end side of the boom; and a working tool coupled to a tip end side of the arm, the plurality of inertial sensors include:

a first inertial sensor that is mounted on the boom and uses a first axis of the three coordinate axes as a determining coordinate axis;

a second inertial sensor that is mounted on the arm and uses a second axis of the three coordinate axes as a determining coordinate axis; and a third inertial sensor that is mounted on the working tool and uses a third axis of the three coordinate axes as a determining coordinate axis, and the controller determines the first inertial sensor as a boom inertial sensor in case an angular velocity of the first axis is equal to or more than a first axis determination threshold value and the plurality of movable parts are operated, determines the second inertial sensor as an arm inertial sensor in case an angular velocity of the second axis is equal to or more than a second axis determination threshold value, and determines the third inertial sensor as a working tool inertial sensor in case an angular velocity of the third axis is equal to or more than a third axis determination threshold value.

* * * * *